United States Patent Office 3,457,031
Patented July 22, 1969

3,457,031
METHOD OF STERILIZATION
Fritz Linder, P.O. Box 36, 440 60, Skarhamn, Sweden, Göran Frostell, 25, Fafnervagen, Djursholm, Sweden, and Sven-Gunnar Hesselgren, 4, Lagerlofsgatan, Stockholm E, Sweden
No Drawing. Continuation-in-part of applications Ser. No. 309,305, Sept. 16, 1963, and Ser. No. 668,689, Sept. 18, 1967. This application Sept. 11, 1968, Ser. No. 759,193
Int. Cl. A61l 13/00
U.S. Cl. 21—58                4 Claims

ABSTRACT OF THE DISCLOSURE

A method of sterilizing medical and dental instruments which comprises placing the instruments in an ethyl or propyl alcohol solution having a boiling point under 100° C. and to which has been added anticorrosive, bactericidal and lubricating agents. The receptacle or autoclave containing the solution is then hermetically sealed and the solution is heated to a temperature of from 120° C. to 140° C. resulting in a pressure of from 90–120 p.s.i. The instruments are sterilized within 1 to 5 minutes at these temperature pressure ranges. The sterilization is accomplished by the combined action of antimicrobial substances and heat with pressure as a contributory factor.

Background of the invention

This application is a continuation-in-part of application Ser. No. 309,305, filed Sept. 16, 1963, and application Ser. No. 668,689, filed Sept. 18, 1967, by the same applicants, now both abandoned.

This invention relates to a method of sterilizing instruments, and more specifically of medical and dental instruments, such as hand and angle pieces for dental drills and the like, in a pressure-resistant and hermetically closable receptacle.

Current methods of disinfecting dental instruments, such as cold disinfection, exposure to dry heat or autoclaving, are very time-consuming and according to more recent experiments not quite satisfactory particularly for instruments of a geared type.

Disinfectants, whether used for rinsing, spraying, or even protracted immersion of instruments, can accomplish superficial disinfection but not sterilization. The high temperature used in oil or dry heat sterilization processes may damage or destroy sensitive parts of the instruments. Moreover, these methods require long sterilization times, and when oiled sterilization is used, the instruments must subsequently be freed from excess oil by centrifugation.

Recent studies have also shown that steam sterilization of dental instruments is impended by oil which has been used for lubrication. Autoclaving also entails a risk of corrosion.

It is the object of the present invention to eliminate the aforementioned disadvantages.

To attain this object, the present invention provides a method of sterilizing instruments, such as medical and dental instruments, in a pressure-resistant and hermetically closable receptacle, which method comprises the steps of placing the instruments to be sterilized into said receptacle, filling said receptacle with a sterilizing soluton of ethyl or propyl alcohol containing anticorrosive and/or bactericidal agents in an amount of 0.1 to 5 percent by weight together with a lubricating agent in an amount of 1 to 10 percent by weight so that the instruments are covered by said solution during the sterilization process, closing said receptacle hermetically, heating said closed receptacle in order to achieve a temperature of said solution from about 120° C. to about 140° C. causing a pressure within said receptacle from 90 p.s.i. to 120 p.s.i. and keeping said solution at said temperature for a time period of 1 to 5 minutes and finally leaving said receptacle containing said sterilizing solution to cool down.

The main component of the sterilizing solution thus is ethyl or propyl alcohol having a vaporizing point below 100° C. at normal atmospheric pressure.

According to the proposed method, the sterilizing periods are appreciably reduced over those of the hitherto known methods.

A further advantage of the present invention consists in that the sterilizing solutions contain a lubricant, which after the cooling down is left in the form of a thin film on the sterilized instruments, so that not only the sterilization of the instruments but also a sterile lubrication thereof can simultaneously be obtained. This feature, moreover, affords the further advantage that the old lubricating oil on the instruments will be dissolved and washed off in each subsequent sterilization process by the flow of the sterilizing solution. As the lubricant added to the sterilizing solution is used a vegetable oil, such as castor oil, or a silicone oil and even a mineral oil. The oil content of the sterilizing solution is 1 to 10, preferably between 4 and 6, percent by weight.

The pressure rise, which is a result of the relatively low vaporization temperature of the sterilizing solution has no intrinsic sterilizing effect but the vigorous movement produced in said solution by the elevation of temperature and the fall during cooling promotes penetration of the solution to all parts of the instruments thus facilitating cleaning and sterilization.

In addition to lubricating oils the sterilizing solution also contains corrosion inhibitors such as sodium nitrite, sodium bensoate, triethanolamine phosphate and other known inhibitors and/or antibacterial agents in an amount of 0.1 to 5% by weight such as quaternary ammonium compounds, for example benzalkonium chloride or phenol derivatives such as hexachlorophene, thymol and the like.

For carrying out the method proposed by the present invention hermetically closable sterilizing receptacles may be used. Such a sterilizing receptacle may consist, for example, of a metal tube provided wih a bottom and having a lid for hermetically closing the open part thereof. It is self-evident that also any other suitable form of reecptacle may be used which permits the sterilization of articles of different sizes and shapes.

The method proposed by the present invention will be described in detail in the following bacteriologic tests.

Experiment I (a) A number of pieces of stainless steel band, 5 x 10 mm. in size, having a rough surface, were contaminated with two drops of a suspension of two parts garden soil in one part distilled water, and were then dried in air for about 12 hours. The contamination metal pieces were put into tube-like receptacles which were filled with a sterilizing solution containing

| | g. |
|---|---|
| Ethyl alcohol | 91 |
| Castor oil | 5 |
| Benzalkonium chloride | 1 |
| Sodium nitrite | 0.5 |

The tops were screwed on and the tubes were placed in a specially made stand and immersed for varying times (1, 5, 10 and 20 minutes) in a water bath at 80° C.

The tubes were thereafter cooled in water. The tops were unscrewed, the fluid was poured off and the metal pieces were rinsed in sterile distilled water. Having thus been freed from the sterilizing solution, the pieces were transferred to broth tubes containing 10 ml. Brewer broth or brain-heart infusion (Difco). These tubes were incubated at 37° C. and the cultures were read after 1, 3, 5, 7, and 12 days. In order to avoid confusing bacterial growth with precipitation of substrate compounds, suspected growth in the broth tubes was seeded into new tubes and onto blood agar plates for aerobic and anaerobic cultures. Microscopy of smears was also performed.

(b) In otherwise analogous experiments, the sterilizing receptacles were immersed in boiling water (100° C.).

(c) Similarly prepared receptacles or tubes were placed in an autoclave, the operation temperature of which oscillated between 120–124° C., for the same periods of time (1, 5, 10 and 20 minutes).

The results of these experiments are presented in Table 1.

Experiment II

In this experimental series, the soil was suspended in oil (Valvoline ETC light SAE 5) instead of in distilled water. The matrices thus were contaminated with earth spores in mineral oil (two parts soil and one part oil). This oil is practically insoluble in the sterilizing solution. In preliminary experiments, the oil was shown to have no bactericidal action. The matrices were completely covered with the suspension and consequently were grossly contaminated with the spore-bearing soil. Table 2 shows the results.

Experiment III

Gears were removed from a number of contra-angles and were dipped in the suspension of earth spores in oil so that each gear was completely covered with suspension. The instruments were then reassembled and each was placed in a tube. The sterilizing solution was poured in until the contra-angles were completely covered. The described experiments were then repeated, but with times ranging from 1 to 30 minutes and temperatures from 80 to 140° C. The gears were thereafter removed aseptically, washed in distilled water and transferred to tubes of culture medium, which were incubated in the usual way. For the temperatures 80 and 100° C., a water bath was used, whereas for 120 and 140° C., an autoclave was used. Table 3 gives the results of these experiments.

Experiment IV

Gears from contra-angles were contaminated as in experiment III and the instruments were placed in sterilizing tubes. The tubes were inserted into the special compartments of a heater having the desired temperature. Each experiment involved four instruments, one in each tube. The gears were transferred as before to broth tubes for incubation. Temperatures, times and results are shown in Table 4.

The experiments in which bacterial growth occurred were regarded as positive controls, since the experimental procedure and the amount and composition of the sterilizing solution remained constant, although temperature and sterilizing times varied. Negative controls (i.e., with presterilized instruments) were also run in all experimental series.

Only soil containing bacteria and earth spores was used as an inoculum in these experiments. Tests using other microbial species were considered unnecessary, as heat was the major factor in the sterilizing effect.

The garden soil which was used in our investigations is of the same sort that is used in routine controls of dry heat sterilizers and autoclaves. The earth spores have been shown in preliminary tests to survive 25 minutes in dry heat (180° C.), but not 30 minutes. When covered by a thin layer of mineral oil, they survived 55 minutes, but not 60 minutes at 180° C.

Autoclaving at 120–125° C. was tolerated 10 minutes, but not 15 minutes. When covered by a thin layer of oil, the spores tolerated 15 but not 20 minutes of autoclaving. Temperature rising periods, 30 minutes for dry heat sterilization and 3–5 minutes for autoclave sterilization, are not included in these figures. Thus, the test objects were more resistant than those generally used (for example, *Bacillus subtilis globigii*, Spordex; *Bacillus stearothermophilus*, Spordex, Amsco).

Measurements of temperature and pressure

Attempts were made to measure the temperature and pressure in the autoclave and in the tubes simultaneously throughout the sterilizing process.

Temperature was measured with a six-point thermoelectric Ellab element. The Teflon-insulated lead was introduced through a hole in the top of a tube, so that the measuring point lay midway in the cylinder. The top was then sealed with silicone rubber. The tube, which contained two contra-angles, and which was filled with sterilizing solution, was placed horizontally in the autoclave. Another measuring point was placed on the floor of the autoclave. The leads were brought out through the rubber packing in the autoclave door to the temperature gauge.

Pressure within the tube was measured with the aid of a fine copper tube running from inside the top of the cylinder through the door of the autoclave to a manometer calibrated from 1 to 12 atm. The hole in the tube top was sealed with silver solder, and that in the door of the autoclave with silicone rubber. The pressure in the chamber of the autoclave was read from the built-in manometer. In this way, it was possible to measure the pressure and temperature in the chamber of the autoclave and in the tube during the whole sterilizing period.

The pressure in the tubes when filled with sterilizing solution was approximately as follows.

| Degrees centigrade at: | Atm. additional pressure |
|---|---|
| 100 | 2.5 |
| 120 | 4.0 |
| 130 | 5.0 |
| 140 | 6.5 |

The temperature in the tubes was measured with the thermoelectric indicator when the tubes were in position in the heater. Each of the four tubes then contained a contra-angle and sterilizing solution. During the measurements the heater temperature was set at 120, 125 or 130° C.

The adequacy of the lubricant in the sterilizing solution for intensive use of the instruments was tested in special experiments.

Contra-angles of types Dentalair TBD II W (manufactured by Atlas Copco Ltd., Sweden) and KaVo, unused since delivery from the factory, were dismantled and carefully cleaned with solvent so as to remove all the mineral oil that had been applied for lubrication. When the instruments were reassembled, their function could not be tested, as the dry gears would have jammed immediately. (Because of the strict requirements with respect to vibrationless, silent function, a relatively high percentage of new contra-angles must always be reassembled.)

The reassembled contra-angles were each placed in a sterilizing tube which was filled with a sterilizing solution according to the present invention. The tubes were heated in an autoclave and were kept at 140° C. for 10 minutes. So that this temperature could be used, the cylinders were not fitted with a safety fuse.

In testing function after sterilization, a braking device was used which could reduce the speed of rotation by 20 to 25 percent. The instrument was first allowed to rotate unbraked for 10 seconds at about 48,000 r./min. The brake then came into play and the speed was reduced to 36,000–40,000 r./min. for 10 seconds. The air flow was now switched off and the apparatus was allowed to cool for 10 seconds. This process was repeated until the rotation period corresponded to 30 minutes of effective use, a period which was considered to exceed by an appreciable margin the longest clinical use of contra-angles. The test was repeated three times on TBD and KaVo contra-angles, with renewed sterilization between each test.

Results: The instruments functioned well after sterilization, although the TBD contra-angles were somewhat more noisy than normally. No tendency to slowing due to defective lubrication was found, nor was there any detectable increase of temperature in the gears. Wear of cogs and gears could not be judged from these short tests, but the sterilizing procedure seemed to give adequate lubrication, even for very long cavity preparations.

In these tests handpieces and contra-angles with slide bearings and ball bearings, and also turbine contra-angles of types KaVo, SS White, Sterling, Midwest and Dental-air, with washer and chuck of synthetic material was used. The sterilizing procedure was as follows:

Before the initial sterilization, the instruments were dismantled and carefully degreased. In all subsequent treatments, however, preliminary dismantling and cleaning were not carried out.

Reassembled handpieces and contra-angles were placed in tubes which were filled with a sterilizing solution according to the invention so that the instrument was completely covered. The tube top was then screwed on.

When the autoclave was used for heating, the tubes were placed on a covered tray or were wrapped in a towel to prevent contamination of the autoclave with lubricant.

A special heater having separate compartments for the tubes, which is simpler to operate than an autoclave, has been used. The heater can remain plugged in all day without supervision and thus be ready for use at any time.

A sterilizing temperature of 120° C. was routinely used. Higher temperatures are considered to be inadvisable, because many dental instruments have parts made of synthetic material with melting points around 125 to 130° C.

The sterilizing tubes were extracted from the heater with forceps and were cooled in water for a minute or two. When the temperature falls below about 80° C. the tube tops can be unscrewed without risk. At higher temperatures, there is still a positive pressure in the cylinders. We found that it was safe to open the tubes when they could be held in the hand without discomfort.

The instruments were kept in the solution until immediately before use. Excess solution was then run off on sterile gauze before the instrument was mounted for use. The solvent in the sterilizing solution rapidly evaporated and left a scarcely detectable film of oil on instruments and hands. The instruments can also be placed in a sterile jar to drain off before use.

If handpieces and contra-angles are allowed to dry in air for long periods, lubrication is impaired and friction and overheating of gears tend to occur. As already stated, however, the lubrication was shown to be fully adequate, even for long treatments using high-speed rotation.

Instruments have been immersed in sterilizing solution for periods of three to four years, except for relatively brief intervals of clinical use. Some of the instruments have been sterilized about 4,000 to 6,000 times, but showed no detrimental effects of the prolonged contact with said sterilizing solution. Burrs, diamonds and grinding discs of various kinds have also been sterilized.

Asembled scalpels are always kept in fluid-filled tubes. No rust has been detected on the blades and the multiple sterilization does not seem to have impaired their keenness.

Throughout the period of the clinical experiments, no deleterious effects of the sterilizing solution have been observed on mucosa or on operators' hands. No allergic reactions have occurred.

TABLE 1.—METAL PIECES INOCULATED WITH EARTH SPORES AND TREATED AT VARIOUS TIMES AND TEMPERATURES (Receptacles in water bath and in autoclave)

| | | Time in minutes | | | | | | | | Negative Controls | |
|---|---|---|---|---|---|---|---|---|---|---|---|
| | | 1 | | 5 | | 10 | | 20 | | | |
| | Culture Broth | No. of tests | Positive | No. of tests | Positive | No. of tests | Positive | No. of tests | Positive | No. of tests | Positive |
| Temperature, ° C.: | | | | | | | | | | | |
| 80 | Brewer | 5 | 5 | 5 | 2 | 5 | 5 | 5 | 0 | 15 | 0 |
| | Brain-heart | 5 | 1 | 5 | 1 | 5 | 2 | 5 | 0 | 15 | 0 |
| 100 | Brewer | 5 | 0 | 5 | 0 | 5 | 0 | 5 | 0 | 15 | 0 |
| | Brain-heart | 5 | 0 | 5 | 0 | 5 | 5 | 5 | 0 | 15 | 0 |
| 120 | Brewer | 15 | 0 | 15 | 0 | 15 | 0 | 15 | 0 | 15 | 0 |
| | Brain-heart | 15 | 0 | 15 | 0 | 15 | 0 | 15 | 0 | 15 | 0 |

Line in Table indicates border between sterile and unsterile.

TABLE 2.—METAL PIECES INOCULATED WITH EARTH SPORES IN LUBRICATING OIL AND TREATED AT VARIOUS TIMES AND TEMPERATURES (Receptacles in water bath and in autoclave)

| | | Time in minutes | | | | | | | | Negative Controls | |
|---|---|---|---|---|---|---|---|---|---|---|---|
| | | 1 | | 5 | | 10 | | 20 | | | |
| | Culture Broth | No. of tests | Positive | No. of tests | Positive | No. of tests | Positive | No. of tests | Positive | No. of tests | Positive |
| Temperature, ° C.: | | | | | | | | | | | |
| 80 | Brewer | 5 | 5 | 5 | 5 | 5 | 4 | 5 | 5 | 15 | 0 |
| | Brain-heart | 5 | 5 | 5 | 4 | 5 | 2 | 5 | 39 | 15 | 0 |
| 100 | Brewer | 5 | 5 | 5 | 2 | 5 | 1 | 5 | 0 | 15 | 0 |
| | Brain-heart | 5 | 5 | 5 | 4 | 5 | 3 | 5 | 0 | 15 | 0 |
| 120 | Brewer | 20 | 0 | 20 | 0 | 20 | 0 | 20 | 0 | 15 | 0 |
| | Brain-heart | 20 | 0 | 20 | 0 | 20 | 0 | 20 | 0 | 15 | 0 |

Lines in Table indicate border between sterile and unsterile.

TABLE 3.—CONTRA-ANGLES INOCULATED WITH EARTH SPORES IN LUBRICATING OIL AND THE REASSEMBLED INSTRUMENTS TREATED AT VARIOUS TIMES AND TEMPERATURES (Receptacles in water bath and in autoclave)

| | | Time in minutes | | | | | | | | | | Negative Controls | |
|---|---|---|---|---|---|---|---|---|---|---|---|---|---|
| | | 1 | | 5 | | 10 | | 20 | | 30 | | | |
| | Culture Broth | No. of tests | Positive | No. of tests | Positive | No. of tests | Positive | No. of tests | Positive | No. of tests | Positive | No. of tests | Positive |
| Temperature, °C.: | | | | | | | | | | | | | |
| 80 | Brewer | 2 | 2 | 2 | 2 | 2 | 2 | 2 | 2 | | | 15 | 0 |
|  | Brain-heart | 2 | 2 | 2 | 2 | 2 | 2 | 2 | 2 | | | 15 | 0 |
| 100 | Brewer | 6 | 6 | 4 | 4 | 4 | 3 | 4 | 3 | 17 | 1 | 15 | 0 |
|  | Brain-heart | 6 | 6 | 4 | 3 | 4 | 2 | 4 | 2 | 18 | 1 | 15 | 0 |
| 120 | Brewer | 20 | 9 | 20 | 2 | 16 | 0 | 16 | 0 | | | 15 | 0 |
|  | Brain-heart | 20 | 6 | 20 | 1 | 16 | 0 | 16 | 0 | | | 15 | 0 |
| 140 | Brewer | 25 | 0 | 5 | 0 | | | | | | | 15 | 0 |
|  | Brain-heart | 25 | 0 | 5 | 0 | | | | | | | 15 | 0 |

Line in Table indicates border between sterile and unsterile.

TABLE 4.—CONTRA-ANGLES INOCULATED WITH EARTH SPORES IN LUBRICATING OIL AND THE REASSEMBLED INSTRUMENTS TREATED AT VARIOUS TIMES AND TEMPERATURES (Tubes in a special heater)

| | | Time in minutes | | | | | | | | Negative Controls | |
|---|---|---|---|---|---|---|---|---|---|---|---|
| | | 1 | | 5 | | 10 | | 20 | | | |
| | Culture Broth | No. of tests | Positive | No. of tests | Positive | No. of tests | Positive | No. of tests | Positive | No. of tests | Positive |
| Temperature, °C.: | | | | | | | | | | | | |
| 120 | Brewer | | | 40 | 3 | 40 | 0 | 40 | 0 | 30 | 0 |
|  | Brain-heart | | | 40 | 12 | 40 | 0 | 40 | 0 | 30 | 0 |
| 130 | Brewer | 40 | 26 | 40 | 1 | 40 | 0 | | | 30 | 0 |
|  | Brain-heart | 40 | 34 | 40 | 1 | 40 | 0 | | | 30 | 0 |

Line in Table indicates border between sterile and unsterile.

We claim:
1. A method of sterilizing medical and dental instruments in pressure-resistant and hermetically closable receptacle comprising the steps of placing the instruments to be sterilized into said receptacle, filling said receptacle with a sterilizing solution of ethyl or propyl alcohol containing an anticorrosive agent and a bactericidal agent in an amount each of 0.1 to 5 percent by weight together with a lubricating agent in an amount of 1 to 10 percent by weight so that the instruments are covered by said solution during the sterilization process, closing said receptacle hermetically, heating said closed receptacle in order to achieve a temperature of said solution from about 120° C. to about 140° C. causing a pressure within said receptacle from 90 p.s.i. to 120 p.s.i. and keeping said solution at said temperature for a time period of 1 to 5 minutes and finally leaving said receptacle containing said sterilizing solution to cool down.

2. A method as claimed in claim 1, wherein the lubricant is a vegetable oil.

3. A method as claimed in claim 1, wherein the lubricant is castor oil.

4. A method as claimed in claim 1, wherein the lubricant is silicone oil.

References Cited

UNITED STATES PATENTS

| | | | |
|---|---|---|---|
| 1,168,173 | 1/1916 | Davis | 21—2 XR |
| 1,168,174 | 1/1916 | Davis | 21—58 |
| 1,610,859 | 12/1926 | Hollenback | 21—85 |
| 1,983,031 | 12/1934 | Himebaugh et al. | |
| 2,812,231 | 11/1957 | Zar | 21—2 XR |
| 2,832,664 | 4/1958 | Bloch | 21—58 |

FOREIGN PATENTS

| | | |
|---|---|---|
| 339,957 | 4/1904 | France. |
| 471,379 | 9/1937 | Great Britain. |
| 576,720 | 4/1946 | Great Britain. |

OTHER REFERENCES

Crowe, F.W.: Use of Silicone Oils in Maintaining Surgical Instruments. In JAMA 149(16): p. 1464, Aug. 16, 1952.

MORRIS O. WOLK, Primary Examiner

JOSEPH T. ZATARGA, Assistant Examiner

U.S. Cl. X.R.

21—2, 86, 92